US009517791B1

(12) United States Patent
Hawk et al.

(10) Patent No.: US 9,517,791 B1
(45) Date of Patent: Dec. 13, 2016

(54) DETACHABLE ASSEMBLY (71) Applicant: Gen 7, Inc., Elverson, PA (US)

(72) Inventors: T. Daniel Hawk, Birdsboro, PA (US); Chao Hsi Lin, Taipei (TW)

(73) Assignee: Gen 7, Inc., Elverson, PA (US)

( * ) Notice: Subject to any disclaimer, the term of this patent is extended or adjusted under 35 U.S.C. 154(b) by 0 days.

(21) Appl. No.: 14/803,317

(22) Filed: Jul. 20, 2015

(51) Int. Cl.
*B62B 9/26* (2006.01)

(52) U.S. Cl.
CPC ...................................... *B62B 9/26* (2013.01)

(58) Field of Classification Search
CPC ........................................................ B62B 9/26
USPC ................................ 224/409; 312/334.7, 323
See application file for complete search history.

(56) References Cited

U.S. PATENT DOCUMENTS

| 120,645 | A | * | 11/1871 | Holt ........................... B62B 9/26 224/409 |
| 825,695 | A | * | 7/1906 | Beaudet ................. A47B 88/08 312/334.32 |
| 2,757,051 | A | * | 7/1956 | Wilmer .................. A47B 88/12 312/334.16 |
| 3,623,683 | A | * | 11/1971 | Bennett .................. B64D 11/00 224/275 |
| 4,061,395 | A | * | 12/1977 | Boole .................. A47B 88/047 297/188.11 |
| 4,526,419 | A | * | 7/1985 | Bowman .................. A47C 7/68 224/407 |
| 4,580,803 | A | * | 4/1986 | Davis ....................... A61G 5/10 224/407 |
| 4,915,437 | A | * | 4/1990 | Cherry .................... B60R 11/06 108/44 |
| 4,923,208 | A | | 5/1990 | Takahashi et al. |
| 4,930,697 | A | | 6/1990 | Takahashi et al. |
| 4,953,887 | A | | 9/1990 | Takahashi et al. |
| 5,065,920 | A | * | 11/1991 | Amner .................... B60R 7/043 224/275 |
| 5,421,653 | A | * | 6/1995 | Triplette ................. F16C 33/02 312/334.32 |
| 5,741,021 | A | | 4/1998 | Saint et al. |
| 6,152,340 | A | | 11/2000 | Chen et al. |
| 6,241,273 | B1 | | 6/2001 | Gehr |
| 6,286,844 | B1 | | 9/2001 | Cone, II et al. |
| 7,011,318 | B2 | | 3/2006 | Chen |
| 7,090,239 | B2 | | 8/2006 | Yoshie et al. |
| 7,229,083 | B2 | | 6/2007 | Arai et al. |
| 7,290,786 | B2 | | 11/2007 | Cheng et al. |
| 7,789,413 | B2 | | 9/2010 | Hei et al. |
| 2002/0093159 | A1 | | 7/2002 | Turner et al. |

(Continued)

FOREIGN PATENT DOCUMENTS

| AU | WO 03008255 A1 * | 1/2003 | ............... B62B 9/26 |
| CN | 1364712 A | 8/2002 | |

(Continued)

*Primary Examiner* — Justin Larson
(74) *Attorney, Agent, or Firm* — Stephen G Stanton (57) ABSTRACT

A detachable assembly including: a detachable frame including elongated opposing side portions; an assembly structure affixed to the detachable frame, the assembly structure and the detachable frame defining a detachable portion of the detachable assembly; a mounted elongated track assembly, the elongated track assembly having opposing tubular tracks having interior slots adapted to receive the elongated opposing tubular side portions of the detachable frame in a sliding relationship.

11 Claims, 11 Drawing Sheets

(56) References Cited

U.S. PATENT DOCUMENTS

| | | |
|---|---|---|
| 2004/0070178 A1 | 4/2004 | Yoshie et al. |
| 2005/0121871 A1 | 6/2005 | Arai et al. |
| 2007/0075510 A1 | 4/2007 | Hei et al. |
| 2015/0175185 A1 | 6/2015 | Thorpe |
| 2015/0216303 A1* | 8/2015 | Rehage ................. F16C 29/046 312/334.17 |

FOREIGN PATENT DOCUMENTS

| | | |
|---|---|---|
| CN | 101332827 A | 12/2008 |
| CN | 203391831 U | 1/2014 |
| CN | 203739947 U | 7/2014 |
| EP | 1462335 B1 | 10/2009 |
| JP | 2009173075 A | 6/2009 |
| JP | 2012218575 A | 11/2012 |
| WO | 03008255 A1 | 1/2003 |

* cited by examiner

DETACHABLE ASSEMBLY

FIELD OF THE INVENTION

The present invention relates to detachable assemblies such as detachable baskets, and more specifically to improved stroller detachable assemblies, such as detachable baskets, for use with strollers and the like.

BACKGROUND OF THE INVENTION

Strollers, for example, are used to safely transport, for example, a human baby, or a domestic pet such as a cat or a dog. Such strollers include a space, seat, etc., within which the baby or pet is placed. Extra space is generally desirable to contain baby bottles, baby formula, blankets, food, toys—baby or pet, etc. A storage compartment is usually included as a bag, pouch, basket, etc. attached to the back, or underside of the stroller, for example, under the space or seat. Many such storage compartments may be partially, or fully, removed for easier storage, arrangement and access to that which is stored within.

Conventional accessible/removeable storage compartments include relatively complex mechanisms to place the storage compartment underneath the seat, such as using rollers/gliders placed within tracks so the storage compartment may be slid or positioned from under that seat, to an extended position towards the back of the stroller to allow easier access to the materials stored in the storage compartment. Other conventional accessible/removable storage compartments require an at least partial assembly of portions of the storage compartment to permit mounting/placing/movement of the storage compartment on the stroller or the like.

It is an object of the present invention to provide an improved stroller detachable basket, and methods of using the improved stroller detachable basket.

Other objects may appear hereafter.

SUMMARY OF THE INVENTION

The present invention seeks to provide an improved detachable assembly, such as a basket, cooler, carrier, etc., that may be used with, for example, strollers, or the like, for the transportation of babies, domestic pets, and methods of using the improved detachable assembly.

In one exemplary embodiment of the present invention, a detachable assembly includes: a detachable frame including elongated opposing side portions; an assembly structure affixed to the detachable frame, the assembly structure and the detachable frame defining a detachable portion of the detachable assembly; a mounted elongated track assembly, the elongated track assembly having opposing tubular tracks having interior slots adapted to receive the elongated opposing tubular side portions of the detachable frame in a sliding relationship.

In another exemplary embodiment of the present invention a detachable basket assembly includes: a detachable frame including elongated opposing tubular side portions; a fabric pouch attached to the detachable frame, the fabric pouch and detachable frame defining a detachable basket of the detachable basket assembly; a mounted elongated track assembly mounted on a stroller, the elongated track assembly having opposing tubular tracks having interior slots adapted to receive the elongated opposing tubular side portions of the detachable frame in a sliding relationship.

In yet another exemplary embodiment of the present invention, method of using a detachable assembly includes: affixing an assembly structure to a detachable frame to define a detachable assembly structure, the detachable frame having elongated opposing side portions; engaging one end of the elongated side portions with one end of opposing interior slots of respective mounted opposing tracks, the opposing interior slots adapted to receive the elongated tubular side portions in a sliding relationship; and sliding the elongated side portions along the respective opposing interior slots to retain the detachable assembly structure within the mounted opposing tracks.

BRIEF DESCRIPTION OF THE DRAWINGS

The present invention will be more clearly understood from the following description taken in conjunction with the accompanying drawings in which like reference numerals designate similar or corresponding elements, regions and portions and in which.

DETAILED DESCRIPTION OF THE PREFERRED EMBODIMENT

The term "about" when referring to a numerical range or value is a convenience and is to be interpreted as plus or minus 10% of that value or range. For example "from about 100 to 1000" is to be interpreted as within the range of 90 to 1100 and "about 1000" is to be interpreted as from 900 to 1100.

Figure 1:
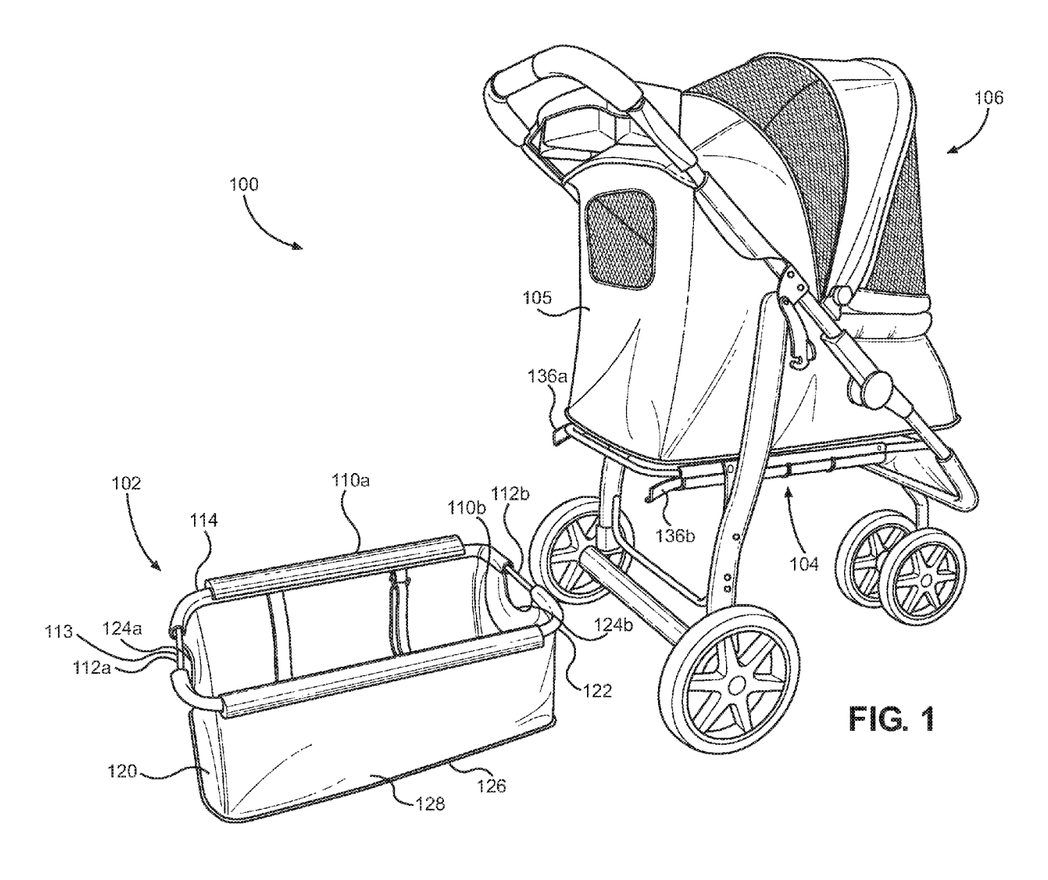
FIG. 1 is a perspective view of a stroller and detachable basket in accordance with an exemplary embodiment of the present invention.
Figure 2:
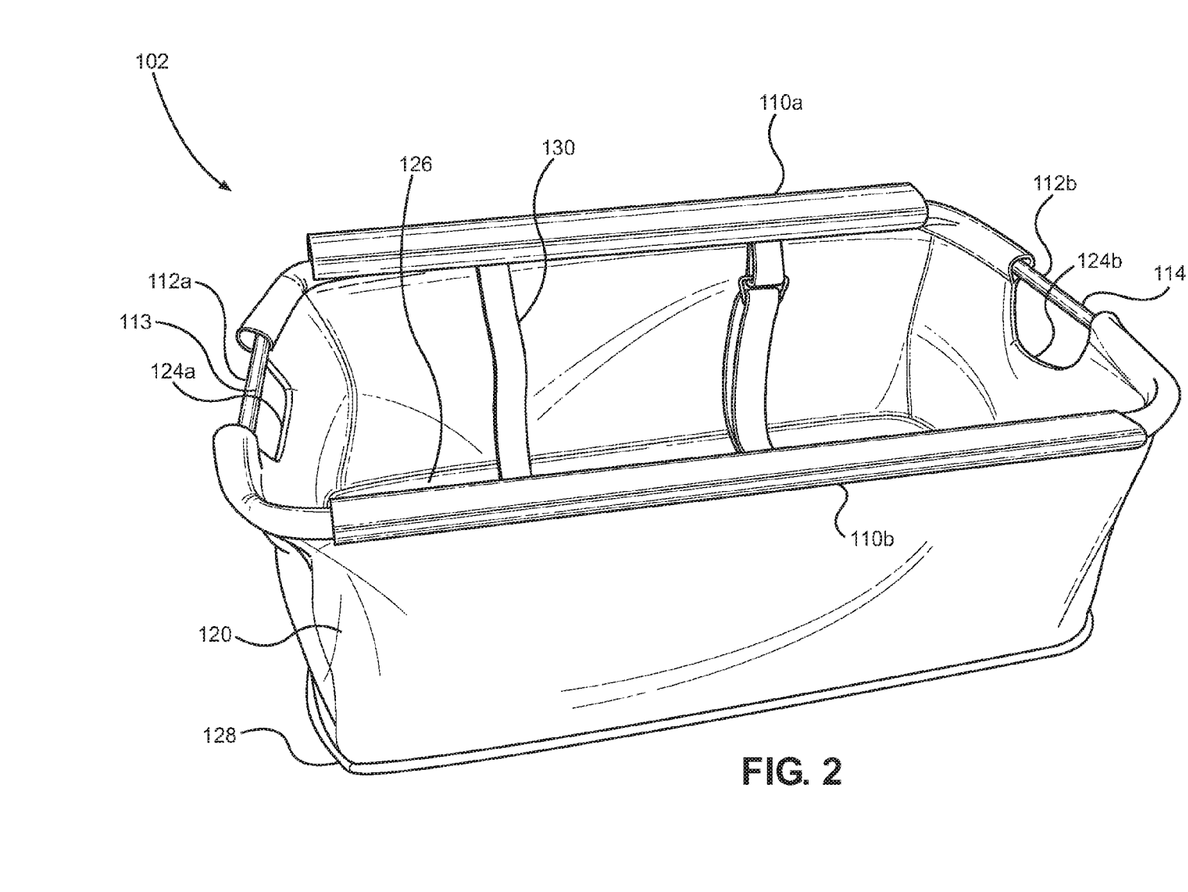
FIG. 2 is a perspective view of a detachable basket in accordance with an exemplary embodiment of the present invention.

As illustrated in the FIGSs, and for example in FIGS. 1 and 2, in an exemplary embodiment of the present invention, detachable basket assembly 100, including detachable basket 102 and elongated track assembly 104 mounted to, for example, stroller 106 is illustrated in FIG. 1. Tubular basket frame 114 includes elongated opposing tubular side portions 110a, 110b connected with opposing tubular end portions 112a, 112b to form rectangular tubular frame 114 with rounded corners. In one exemplary embodiment illustrated in FIG. 10, fabric pouch or basket 120 is fastened or affixed to tubular frame 114 at one end 122 by wrapping around, or otherwise being affixed to inner member 113, with frame 114 covering inner member 113. Frame 114 may be an aluminum tube with a recessed slit 115 for affixing to, and partially surrounding, fabric covered inner member 113 as illustrated. By covering the fabric covered inner member 113, the fabric will not be worn by repeated attachments and detachments onto tubular tracks 134a, 134b as described below. It is noted that other configurations of frame 114 are contemplated, and only fabric covered inner member 113 may function as an upper frame of detachable basket 102. Further, it is contemplated that frame 114 only covers at the elongated opposing tubular side portions 110a, 110b, (as illustrated) and inner member 113 is exposed at the opposing tubular end portions 112a, 112b of detachable basket 102. As illustrated in FIG. 1, openings 124a, 124b or the like are formed in fabric 120 proximate the opposing tubular end portions 112a, 112b of the frame to assist in attaching and removing detachable basket 102 from track assembly 104 as will be described herein. Rectangular tubular frame 114 and track assembly 104 may be formed of metal or plastic, etc. For example, basket frame 114 may be metal and track assembly 104 may be plastic, and each may be sized and spaced for ease of attaching and detaching detachable basket 102 from track assembly 104. Also, as illustrated, track assembly and detachable basket 102 may be positioned beneath a compartment, space or seat 105 of stroller 106.

Figure 8:
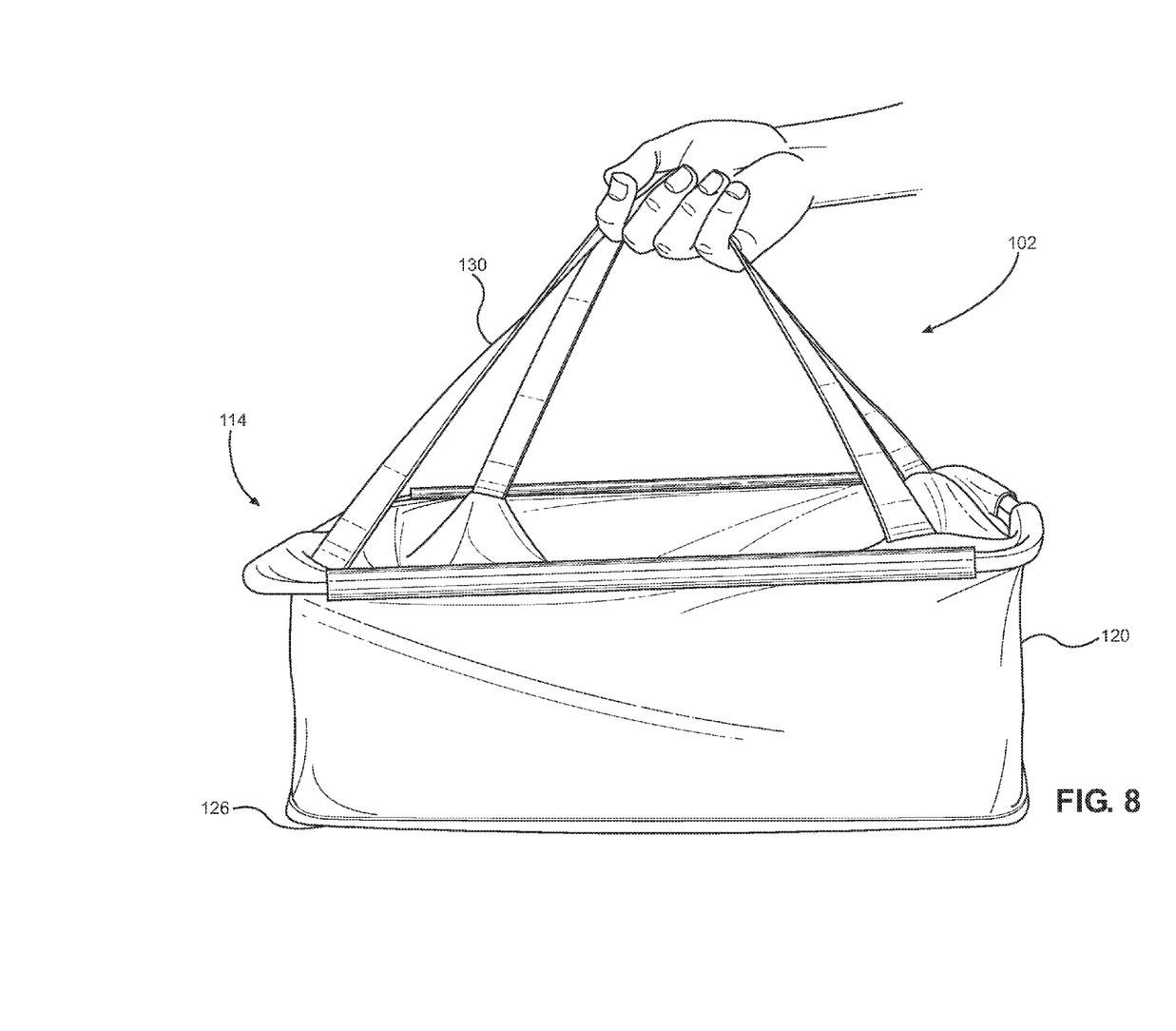
FIG. 8 is a perspective view of a deployed detachable basket in accordance with another exemplary embodiment of the present invention.
Figure 9:
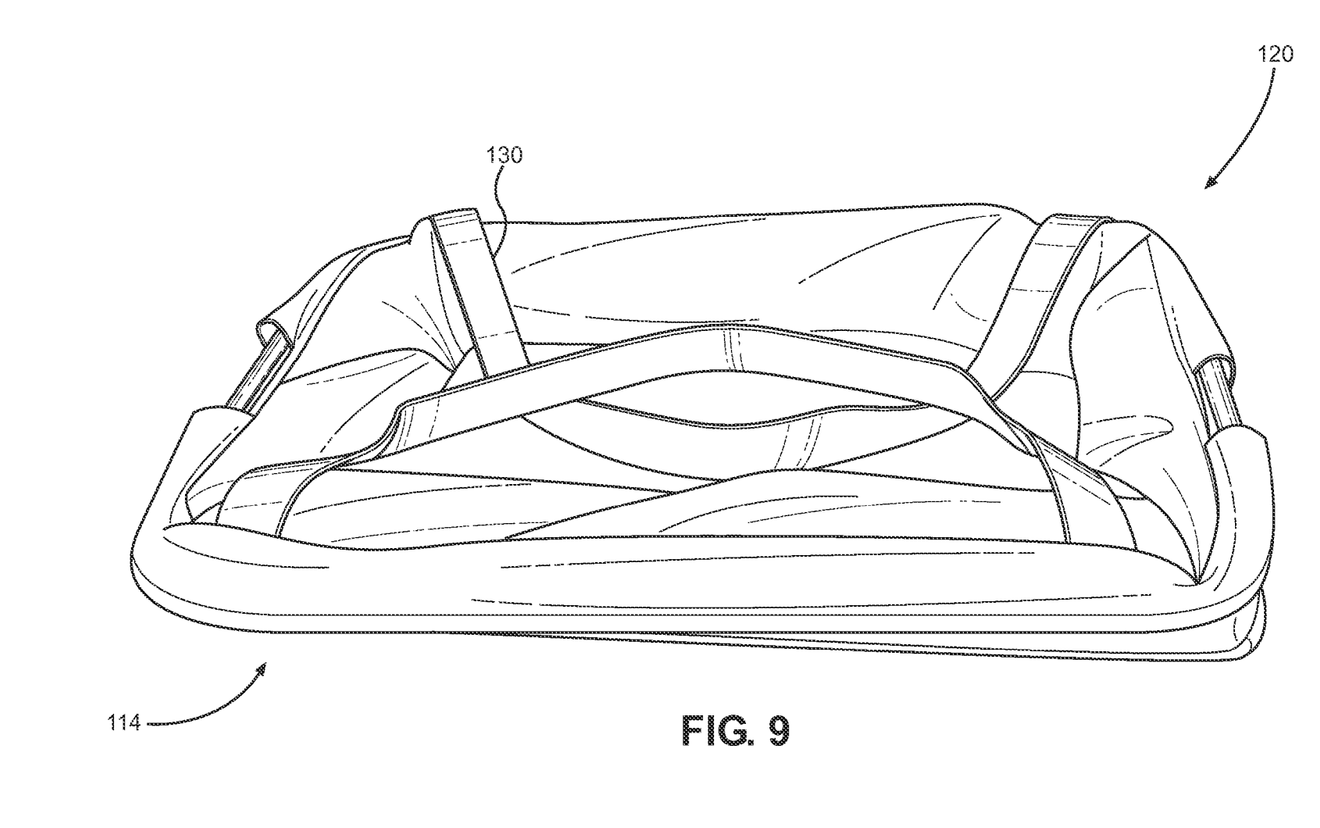
FIG. 9 is a perspective view of a collapsed detachable basket in accordance with an exemplary embodiment of the present invention.

Fabric basket 120 extends downwardly from frame 114 and forms bottom 126 with bottom frame 128. A stiffening bottom board or the like (covered by fabric) may form the bottom of detachable basket 102. Cloth, or the like, straps or handles 130 are attached to portions of opposing sides of detachable basket 102 to assist in picking up and carrying basket 102 and whatever contents when not mounted on track assembly 104 of stroller 106 (e.g., see FIG. 8 of an exemplary embodiment of the present invention). As illustrated in FIG. 9 in an exemplary embodiment of the present invention, detachable basket may be collapsible such that tubular frame 114 is proximate bottom frame 128/a stiffening bottom board. Collapsing detachable basket 102 may allow for ease of storage of basket 102, and ease of storage and transport of stroller 106.

Figure 3:
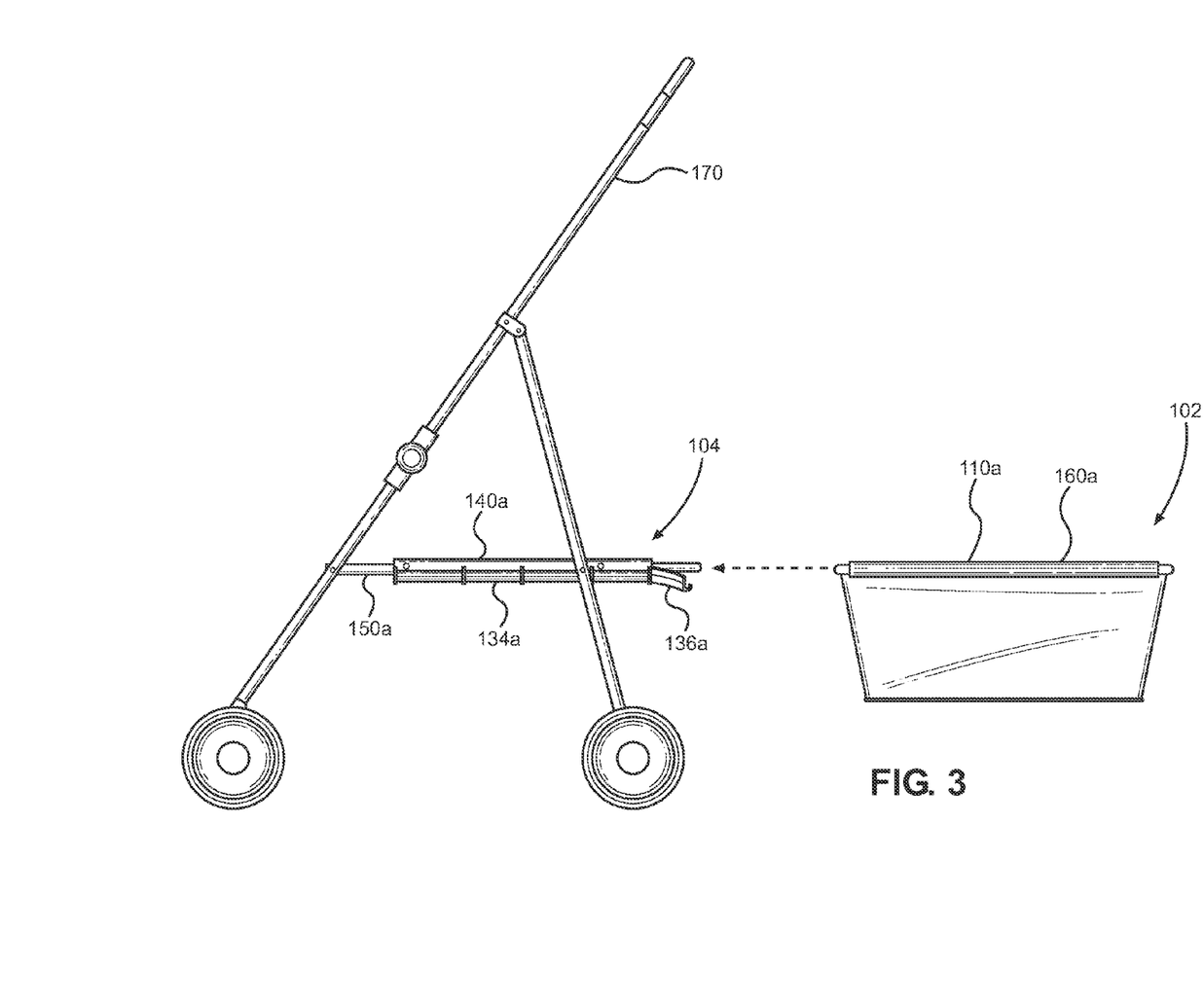
FIG. 3 is a schematic side view of a detachable basket aligned for engagement with a stroller in accordance with an exemplary embodiment of the present invention.
Figure 4:
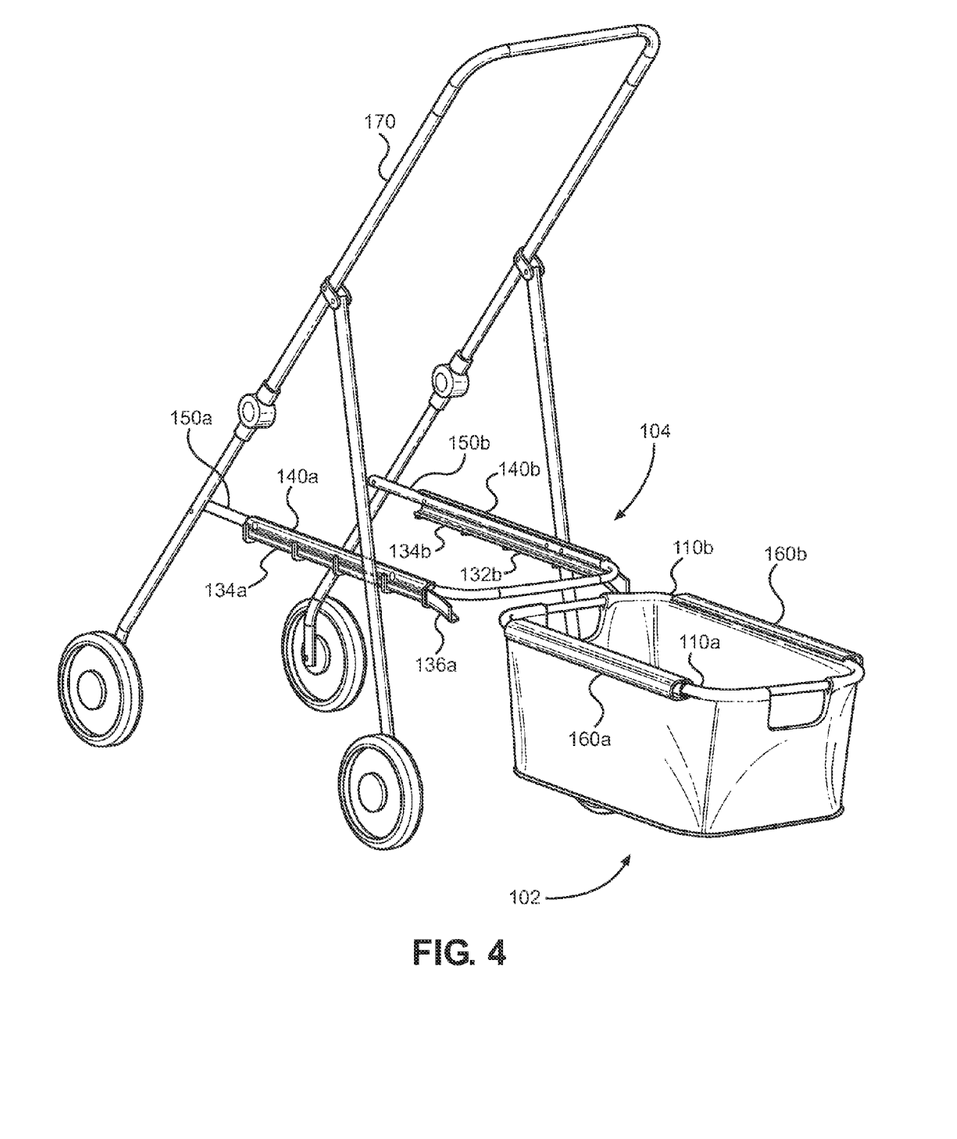
FIG. 4 is a schematic perspective side view of a detachable basket aligned for engagement with a stroller in accordance with an exemplary embodiment of the present invention.
Figure 5:
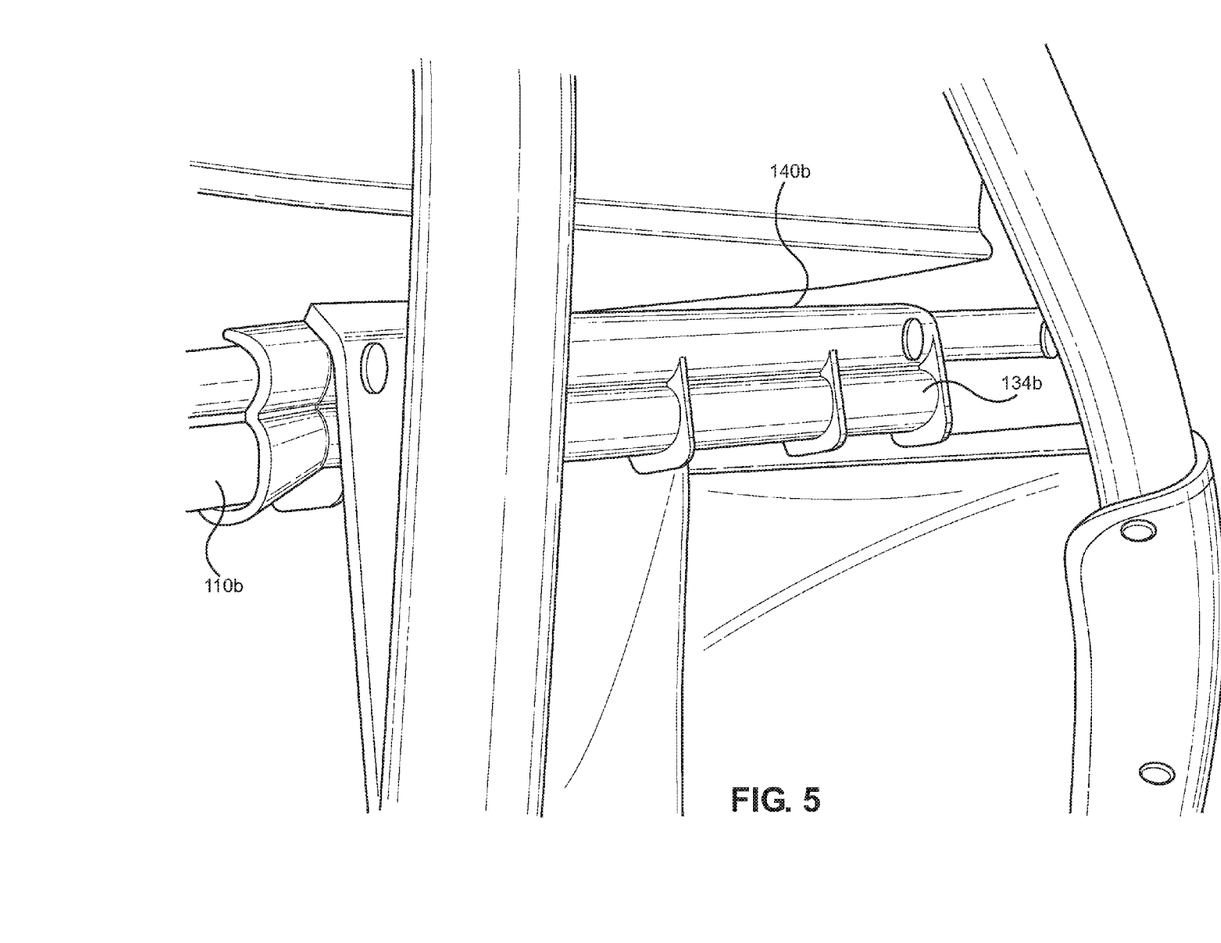
FIG. 5 is an enlarged perspective view of a detachable basket partially engaged with a tubular track in accordance with another exemplary embodiment of the present invention.
Figure 6A:
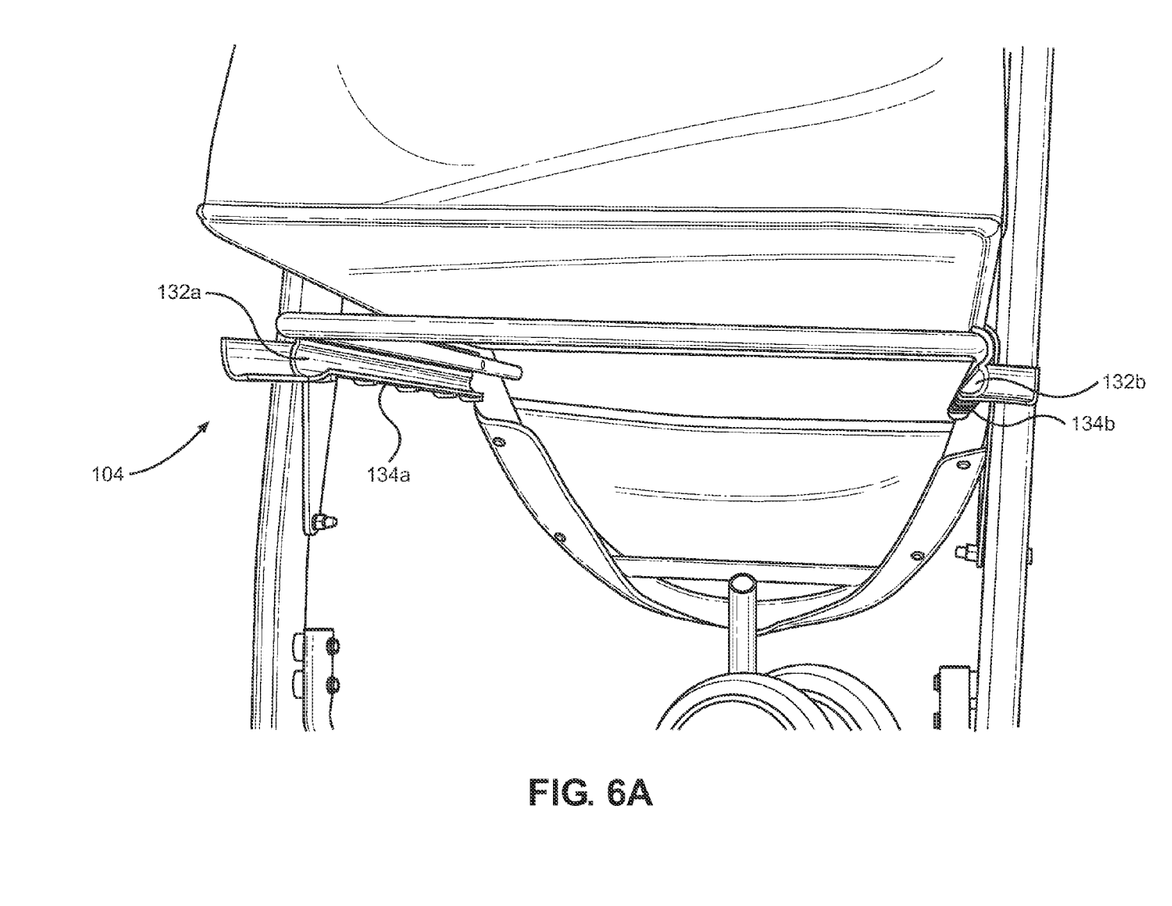
FIGS. 6A-6C are a perspective, rear view of a stroller, and isolated perspective views of the track assembly, in accordance with another exemplary embodiment of the present invention.
Figure 6B:
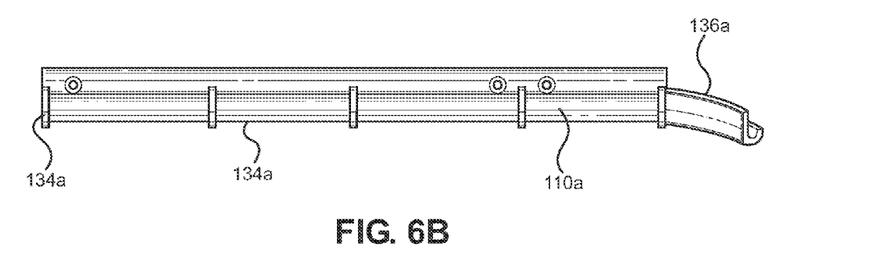
Figure 6C:
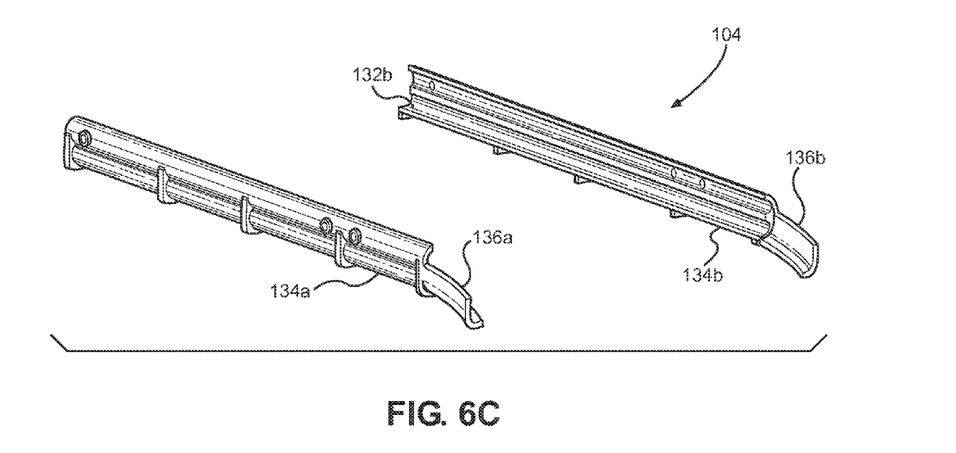

As illustrated in FIGS. 5 and 6A-6C, assembly 104 includes opposing tubular tracks 134a, 134b having respective slots 132a, 132b adapted to receive elongated opposing tubular side portions 110a, 110b of detachable basket frame 114 in a sliding relationship. Ends of slotted tubular tracks 134a, 134b include guide portions 136a, 136b to assist in aligning and engaging detachable basket 102 with tubular tracks 134a, 134b of track assembly 104 a will be described herein. For example, FIGS. 3-4 illustrate respective side and perspective views of an exemplary embodiment of the present invention showing a stroller frame 170, with opposing tubular side portions 110a, 110b of basket frame 114 aligned with respective tubular tracks 134a, 134b. This may illustrate positions ready to mount detachable basket 102 to track assembly 104, or positions relatively just after removal of detachable basket 102 from track assembly 104.

Figure 7:
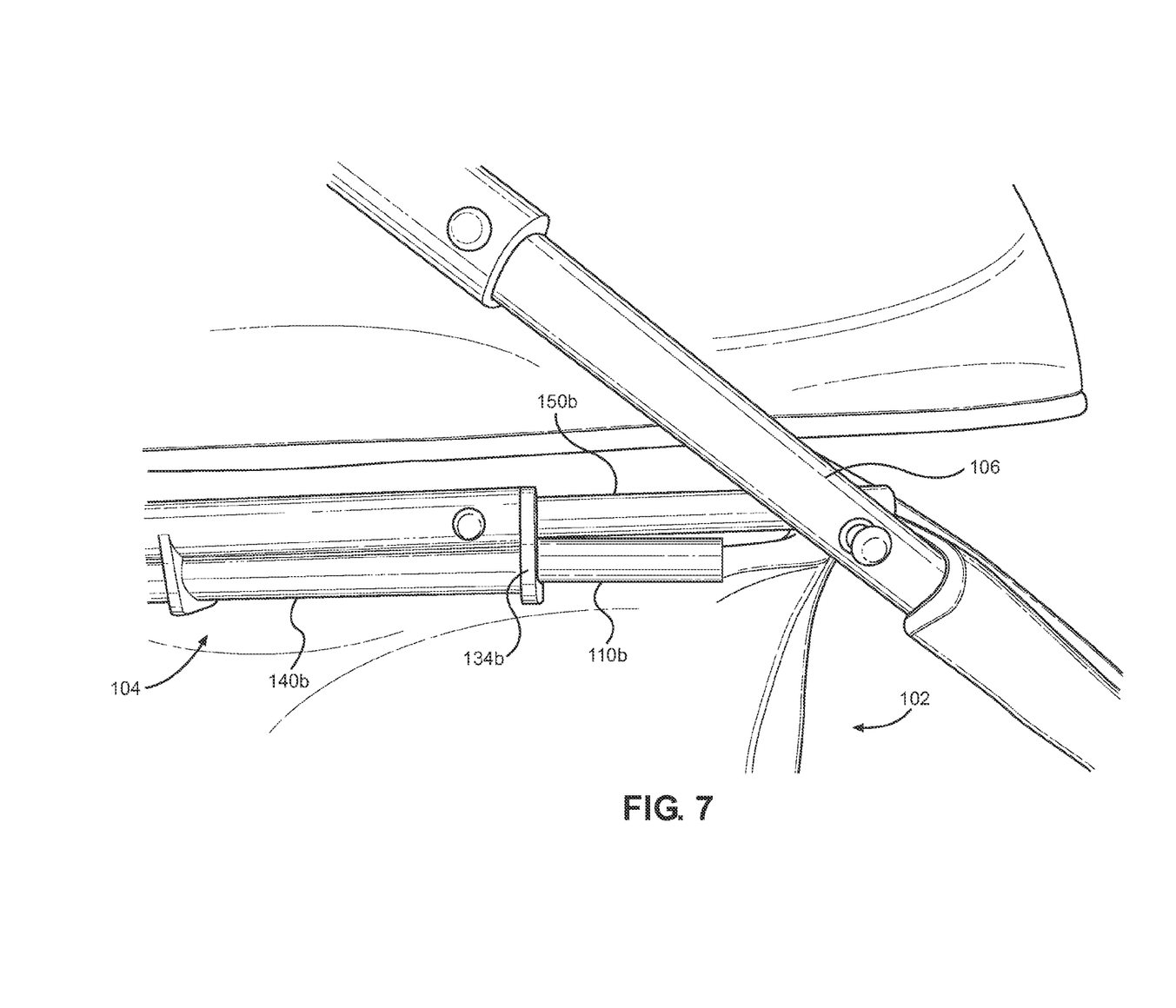
FIG. 7 is a side view of the front of a stroller engaged with opposing tubular tracks in accordance with an exemplary embodiment of the present invention.

FIG. 7 illustrates an exemplary embodiment of the present invention with detachable basket 102 attached to track assembly 104 mounted to stroller 106. Tubular side portions 110a, 110b of frame 114 have been slide fully, or sufficiently fully, along slot 132a, 132b of respective tracks 134a, 134b to seat detachable basket 102. A stop or the like (not shown) may contact or abut tubular end portion 112b to define full engagement of detachable basket 102 within track assembly 104.

As illustrated in FIG. 7, for example, mounting portions 140a, 140b affixed to slotted tubular tracks 134a, 134b, are affixed to portions 150a, 150b of stroller 106 to mount track assembly 104.

Figure 10:
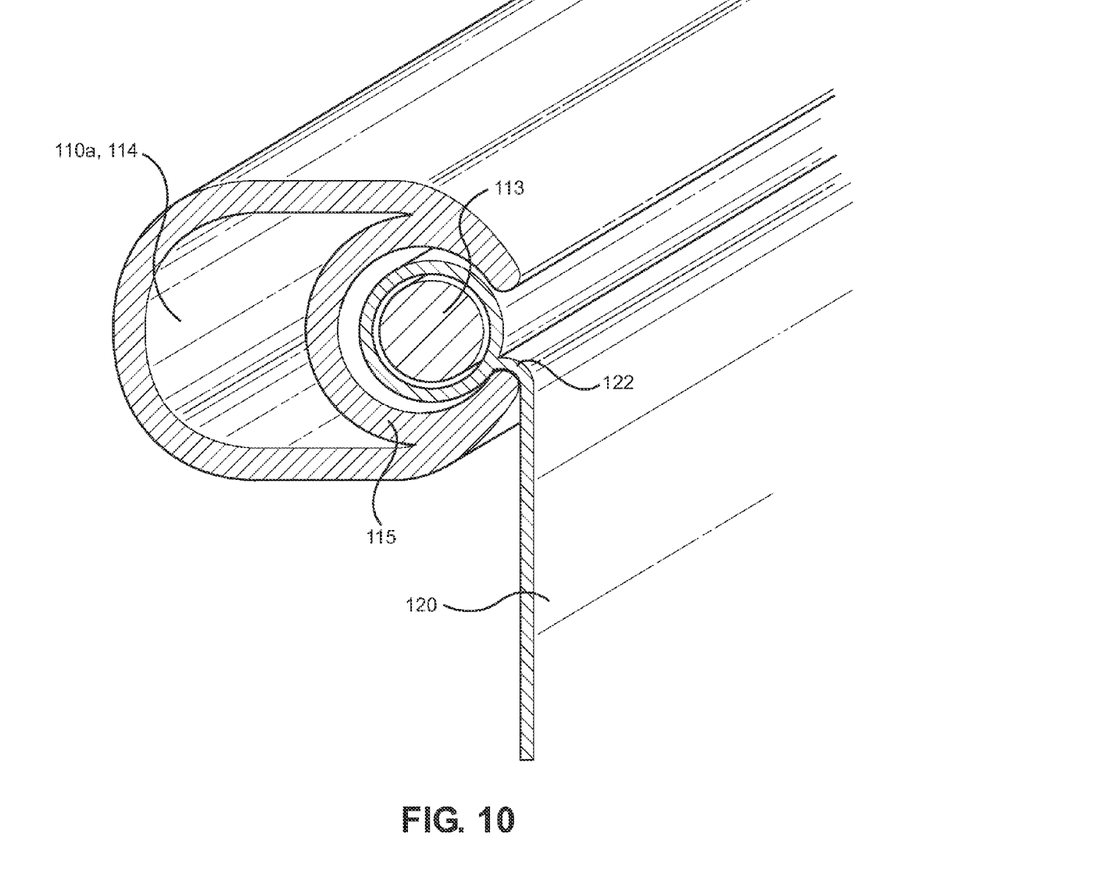
FIG. 10 is a perspective, cross-sectional enlarged view of the detachable basked upper frame member in use in accordance with another exemplary embodiment of the present invention.

Detachable basket's 102 non-fabric covered opposing elongated tubular mounting portions 110a, 110b of frame 114 facilitate sliding engagement with slotted tubular tracks 134a, 134b or track assembly 104 (e.g., see FIG. 10). Otherwise, cloth, or other material, around rectangular frame 114 may tend to abrade or wear over time from the friction caused through multiple attachment and detachment of basket 102 with track assembly 104 as discussed above. Detachable basket is sized to accommodate frame 170 of stroller 106, such that, for example, basket frame 114 may slidingly engage track assembly 104 mounted to stroller frame 170, and such that the exposed end of mounted detachable basket 102 is placed as desired under stroller 106.

A method of use of the detachable basket assembly 100 will now be described. Various objects may be placed within basket 102, such as, for example, toys, food, leashes for pets, baby bottles, a blanket, an umbrella, etc. Basket 102 is positioned and aligned with respect to track assembly 104 mounted to stroller 106. For example, see FIGS. 3-4. Basket 102 may be grasped by hand openings 124a, 124b and/or along tubular side portions 110a, 110b. Ends of respective side portions 110a, 110b are placed proximate guide portions 136a, 136b and basket 102 is pushed towards stroller 106 and track assembly 104 until such ends engage respective slots 132a, 132b of flared portions 136a, 136b, tracks 134a, 134b. Guide portions 136a, 136b may be flared outwardly to assist in engaging basket 102 within slotted tracks 134a, 134b. Detachable basket 102 is then slid along tracks 134a, 134b towards stroller 106 until basket 102 is attached to track assembly 104 and positioned as desired— for example until leading end of basket 102b abuts a stop or the like, and/or trailing end 102a of basket 102 is sufficiently under stroller seat, compartment, etc. The combined weight of basket 102 and its contents may be sufficient to retain the position of basket 102 within slots 132a, 132b of track assembly 104. It is noted that the tubular side portions 110a, 110b with slit 115 cover fabric wrapped member 113 and, as such, sliding of detachable basket 102 along tracks 124a, 124b is enhanced. However, it is contemplated, that fabric wrapped member 113 may be exposed and employed without the use of member(s) 110a, 110b, 114, and as such, the friction of the fabric against slots 132a, 132b may also tend to maintain the position of detachable basket. Straps, buckles, ties, etc. may (also) be employed to assist in retaining basked within track assembly 104 and under stroller 106.

It is noted that the design herein is relatively simple and may be economically manufactured and maintained with essentially no moving parts as basket 102 is simply engaged and slid along slots 132a, 132b of track assembly 104. Various structures may be utilized to secure basket 102 relative to stroller 106 when fully engaged with track assembly 104 such a ties, straps, buckles, etc.

While detachable basket 102 has been described as comprising fabric with rectangular frame 114, other materials are contemplated. For example, including cloth fabric, plastic, metal (such as, for example, wood, metal or plastic mesh, metal or plastic links, etc.). Detachable frame 114 and opposing tracks 134a, 134b need not be tubular, but, for example, may be square shaped or have other shapes, such that detachable frame 114 may fit within, and slide along, slots 132a, 132b of opposing tracks 134a, 134b.

Other structures are contemplated for attachment/detachment with track assembly 104 besides a collapsible basket, for example a non-collapsible basket, a stiff basket, a cooler (the basket may also function as a cooler) or insulated structure to keep cold objects cold, such as soft drinks or food, and hot objects hot, such as food, etc.

While particular embodiments of the present invention have been illustrated and described, it is not intended to limit the invention, and obvious modifications and equivalents are contemplated that fall within the scope of the following claims. The features of the invention expressed in the following claims may be arranged in any combination and in any order within the purview of the following claims.

We claim:

1. A detachable assembly comprised of:
    a detachable frame including elongated opposing tubular side portions;
    an assembly structure affixed to the detachable frame, the assembly structure and the detachable frame defining a slidingly detachable portion of the detachable assembly; and
    a mounted elongated track assembly, the mounted elongated track assembly having opposing tubular tracks having interior slots adapted to receive the elongated opposing tubular side portions of the detachable frame therewithin in a sliding relationship,
    wherein at least the elongated opposing tubular side portions include an inner member, partially surrounded by an outer member having a slit for engagement with the inner member.

2. The detachable assembly of claim 1 wherein the detachable frame is rectangular shaped and includes opposing end portions connected to the elongated opposing tubular side portions, the opposing end portions of the elongated opposing side portions being tubular.

3. The detachable assembly of claim 1 further comprising a stop proximate the mounted elongated track assembly.

4. The detachable assembly of claim 1 wherein the mounted track assembly is mounted to a stroller.

5. The detachable assembly of claim 4 wherein the mounted elongated track assembly includes mounting portions mounted to the stroller.

6. The detachable assembly of claim 5 wherein the mounted elongated track assembly includes guide portions at one end thereof.

7. A detachable basket assembly comprised of:
    a detachable frame including elongated opposing tubular side portions;
    a fabric pouch attached to the detachable frame, the fabric pouch and detachable frame defining a slidingly detachable basket of the detachable basket assembly; and
    a mounted elongated track assembly mounted on a stroller, the mounted elongated track assembly having opposing tubular tracks having interior slots adapted to receive the elongated opposing tubular side portions of the detachable frame therewithin in a sliding relationship,
    wherein the mounted elongated track assembly includes mounting portions mounted to a stroller, and
    wherein the mounted elongated track assembly includes guide portions at one end thereof, and wherein at least the elongated opposing tubular side portions include an inner member to which fabric of the fabric pouch is attached, partially surrounded by an outer member having a slit for engagement with the inner member.

8. The detachable basket assembly of claim 7 wherein the detachable frame is rectangular shaped and includes opposing tubular end portions connected to the elongated opposing side portions, the opposing end portions of the elongated opposing side portions being tubular.

9. The detachable basket assembly of claim 7 wherein the fabric pouch does not contact the interior slots.

10. The detachable basket assembly of claim 7 further comprising a stop proximate the mounted elongated track assembly.

11. The detachable basket assembly of claim 7 wherein the fabric pouch is collapsible.

\* \* \* \* \*